(12) United States Patent
Yun

(10) Patent No.: US 9,838,174 B2
(45) Date of Patent: Dec. 5, 2017

(54) BROADCASTING SIGNAL TRANSMITTING APPARATUS AND METHOD FOR CONTROLLING THE SAME

(71) Applicant: SAMSUNG ELECTRONICS CO., LTD., Suwon-si (KR)

(72) Inventor: Sung-ryul Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 14/290,062

(22) Filed: May 29, 2014

(65) Prior Publication Data
US 2014/0362781 A1 Dec. 11, 2014

(30) Foreign Application Priority Data
Jun. 10, 2013 (KR) .......................... 10-2013-0066188

(51) Int. Cl.
*H04L 5/00* (2006.01)
*H04H 20/72* (2008.01)
(Continued)

(52) U.S. Cl.
CPC .......... *H04L 5/0023* (2013.01); *H04H 20/72* (2013.01); *H04L 5/0048* (2013.01);
(Continued)

(58) Field of Classification Search
None
See application file for complete search history.

(56) References Cited

U.S. PATENT DOCUMENTS

2007/0230590 A1\* 10/2007 Choi ..................... H04L 5/0053
375/260
2009/0232071 A1 9/2009 Cho et al.
(Continued)

FOREIGN PATENT DOCUMENTS

EP 2536135 A2 12/2012
JP 2006-295349 A 10/2006
(Continued)

OTHER PUBLICATIONS

International Search Report dated Sep. 16, 2014 issued by the International Searching Authority in counterpart International Application No. PCT/KR2014/004910.
(Continued)

*Primary Examiner* — Yaotang Wang
(74) *Attorney, Agent, or Firm* — Sughrue Mion, PLLC

(57) ABSTRACT

A broadcasting signal transmitting apparatus that transmits a plurality of signals through a plurality of antennas to increase a data transmission rate. The broadcasting signal transmitting apparatus includes a signal generator configured to generate the plurality of signals each of which includes at least one preamble symbol and data symbols, a frequency allocator configured to allocate a first subcarrier position of a whole frequency to a first preamble symbol included in a first signal among the plurality of signals and to allocate, by shifting a frequency position of the first subcarrier position by a preset interval, a second subcarrier position to a second preamble symbol included in a second signal among the plurality of signals, and a transmitter configured to transmit the plurality of signals through the plurality of antennas. The antennas respectively correspond to subcarrier positions allocated to the plurality of signals.

15 Claims, 14 Drawing Sheets

(51) Int. Cl.
H04L 27/26 (2006.01)
H04B 7/06 (2006.01)
(52) U.S. Cl.
CPC ......... H04L 27/2613 (2013.01); H04B 7/068 (2013.01); H04L 27/2656 (2013.01)

(56) References Cited

U.S. PATENT DOCUMENTS

| | | | |
|---|---|---|---|
| 2011/0013729 A1 | 1/2011 | Yuba et al. | |
| 2011/0019694 A1* | 1/2011 | Kwon | H04L 27/2613 370/474 |
| 2011/0222504 A1 | 9/2011 | Ma et al. | |
| 2013/0083728 A1* | 4/2013 | Park | H04W 68/005 370/328 |

FOREIGN PATENT DOCUMENTS

| | | | |
|---|---|---|---|
| KR | EP 2536135 A2 * | 12/2012 | ............ H04H 20/72 |
| WO | 2011/096773 A2 | 8/2011 | |

OTHER PUBLICATIONS

Written Opinion dated Sep. 16, 2014 issued by the International Searching Authority in counterpart International Application No. PCT/KR2014/004910.

* cited by examiner

FIG. 4

1K FFT – 128 Length
PAPR = 6.48dB 9 16 21 26 32 40 45 50 56 62 68 74 79 85 90 97 103 109 121 126 132 141 147 153 160 166 173 182 188 194 200 205 210 215 224 231 236 242 247 252 259 265 273 279 284 291 303 310 319 324 333 340 347 353 362 371 377 384 390 398 403 408 414 424 429 437 445 450 456 463 471 476 481 487 493 502 509 518 527 536 545 550 556 566 572 577 587 593 599 607 614 620 627 632 640 646 656 661 671 676 682 687 694 700 707 712 717 722 727 732 737 742 750 755 763 768 777 783 788 795 800 805 812 818 826 834 842 847

FIG. 5

2K FFT – 256 Length
PAPR = 6.99dB 10 16 21 29 37 42 48 59 65 73 78 86 94 101 107 114 121 126 134 140 148 154 162 168 174 181 186 192 197 202
207 214 221 229 235 241 250 256 265 271 276 281 291 299 307 312 317 323 328 333 338 344 349 355 361 370
378 386 393 403 408 415 424 431 439 446 456 462 467 476 483 490 495 501 506 512 517 522 528 535 540 547
553 565 570 575 583 589 594 600 607 614 620 627 634 640 647 656 662 669 674 679 684 690 695 701 706 711
717 726 731 742 747 754 760 765 770 778 783 789 795 803 809 818 828 834 840 848 853 859 869 876 881 886
894 899 906 912 918 923 928 934 939 945 952 958 966 973 980 986 991 996 1001 1011 1019 1024 1030 1035
1040 1046 1051 1056 1061 1067 1074 1081 1088 1093 1099 1104 1112 1120 1128 1136 1143 1150 1157 1162
1169 1174 1179 1186 1196 1201 1207 1213 1220 1225 1232 1242 1248 1256 1261 1267 1272 1281 1287 1295
1302 1307 1313 1321 1329 1335 1340 1349 1355 1360 1365 1372 1380 1387 1396 1401 1408 1415 1424 1433
1439 1444 1451 1456 1467 1473 1483 1490 1495 1500 1507 1513 1523 1529 1534 1539 1544 1552 1561 1569
1574 1579 1584 1592 1602 1608 1617 1623 1629 1637 1646 1657 1662 1671 1677 1685 1693 1698

FIG. 6

4K FFT – 512 Length
PAPR = 7.73dB 5 13 20 28 36 43 49 54 60 68 76 86 91 96 101 107 117 125 132 139 145 152 158 166 171 179 186 195 204 211 216
221 227 233 240 246 253 258 264 270 275 283 290 297 306 314 319 328 333 338 346 353 361 367 372 379 384
391 396 401 406 411 416 421 426 433 440 448 453 460 465 470 475 481 487 494 499 508 517 522 527 536 543
549 557 563 575 585 591 596 601 606 611 617 623 630 635 642 649 656 666 671 678 688 693 698 708 715 725
732 740 748 753 759 765 772 780 790 800 807 816 824 831 837 843 852 859 868 873 878 887 897 907 912 919
926 935 943 954 959 965 971 976 983 989 998 1006 1012 1020 1029 1039 1047 1052 1058 1065 1071 1079 1084
1090 1096 1102 1107 1112 1117 1122 1127 1133 1138 1144 1149 1155 1163 1168 1174 1180 1185 1191 1197
1202 1210 1215 1223 1228 1233 1238 1243 1248 1254 1262 1271 1276 1281 1286 1291 1298 1307 1314 1323
1329 1336 1342 1349 1356 1362 1368 1373 1378 1383 1391 1397 1402 1407 1414 1419 1428 1434 1440 1450
1455 1460 1468 1473 1478 1483 1488 1494 1501 1506 1513 1518 1523 1529 1538 1548 1557 1563 1571 1577
1582 1588 1593 1598 1606 1614 1623 1630 1637 1645 1651 1662 1667 1673 1680 1685 1691 1697 1704 1713
1723 1728 1733 1741 1746 1752 1758 1764 1773 1778 1787 1797 1806 1811 1817 1822 1832 1838 1845 1850
1855 1860 1865 1873 1879 1884 1889 1894 1899 1904 1914 1919 1926 1932 1937 1943 1956 1963 1969 1976
1981 1990 1995 2002 2008 2013 2018 2024 2029 2034 2040 2045 2052 2058 2063 2069 2076 2088 2093 2100
2109 2118 2128 2134 2139 2148 2156 2163 2170 2180 2186 2192 2197 2202 2208 2217 2226 2234 2240 2245
2250 2257 2262 2267 2273 2278 2284 2291 2297 2302 2308 2317 2322 2330 2336 2344 2349 2361 2368 2376
2384 2389 2394 2402 2407 2417 2425 2430 2438 2445 2451 2456 2464 2472 2478 2485 2491 2498 2503 2511
2516 2524 2530 2539 2548 2556 2561 2568 2575 2581 2588 2596 2601 2609 2616 2624 2629 2639 2646 2651
2657 2664 2669 2676 2686 2691 2698 2706 2711 2716 2722 2728 2737 2744 2754 2762 2770 2775 2783 2790
2795 2803 2809 2815 2821 2826 2832 2837 2843 2850 2856 2862 2871 2876 2881 2892 2898 2904 2910 2916
2921 2927 2935 2940 2945 2955 2960 2965 2971 2976 2981 2992 2998 3003 3008 3017 3022 3030 3036 3042
3049 3054 3059 3064 3069 3074 3079 3087 3096 3102 3107 3116 3127 3136 3144 3154 3164 3170 3178 3184
3193 3200 3209 3215 3220 3229 3235 3240 3246 3251 3256 3264 3271 3276 3283 3288 3293 3302 3307 3312
3321 3332 3339 3344 3350 3355 3360 3368 3374 3379 3385 3391 3398 3403

FIG. 7

| FFT Size | | 1024 | 2048 | 4096 |
|---|---|---|---|---|
| Number of Active Subcarriers | | 853 | 1705 | 3409 |
| Preamble Length | 64 | 13.3 | 26.6 | 53.3 |
| | 128 | 6.7 | 13.3 | 26.6 |
| | 256 | 3.3 | 6.7 | 13.3 |
| | 384 | 2.2 | 4.4 | 8.9 |
| | 512 | 1.7 | 3.3 | 6.7 |

FIG. 8

| Modulation Sequence | Active Carriers in P1 (Antenna 1) |
|---|---|
| CSS1 (64) | 44 45 47 51 54 59 62 64 65 66 70 75 78 80 81 82 84 85 87 88 89 90 94 96 97 98 102 107 110 112 113 114 116 117 119 120 121 122 124 125 127 131 132 133 135 136 137 138 142 144 145 146 148 149 151 152 153 154 158 160 161 162 166 171 |
| CSS2 (256) | 172 173 175 179 182 187 190 192 193 194 198 203 206 208 209 210 212 213 215 216 217 218 222 224 225 226 230 235 238 240 241 242 244 245 247 248 249 250 252 253 255 259 260 261 263 264 265 266 270 272 273 274 276 277 279 280 281 282 286 288 289 290 294 299 300 301 303 307 310 315 318 320 321 322 326 331 334 336 337 338 340 341 343 344 345 346 350 352 353 354 358 363 364 365 367 371 374 379 382 384 385 386 390 395 396 397 399 403 406 411 412 413 415 419 420 421 423 424 425 426 428 429 431 435 438 443 446 448 449 450 454 459 462 464 465 466 468 469 471 472 473 474 478 480 481 482 486 491 494 496 497 498 500 501 503 504 505 506 508 509 511 515 516 517 519 520 521 522 526 528 529 530 532 533 535 536 537 538 542 544 545 546 550 555 558 560 561 562 564 565 567 568 569 570 572 573 575 579 580 581 583 584 585 586 588 589 591 595 598 603 604 605 607 611 612 613 615 616 617 618 622 624 625 626 628 629 631 632 633 634 636 637 639 643 644 645 647 648 649 650 654 656 657 658 660 661 663 664 665 666 670 672 673 674 678 683 |
| CSS3 (64) | 684 689 692 696 698 699 701 702 703 704 706 707 708 712 714 715 717 718 719 720 722 723 725 726 727 729 733 734 735 736 738 739 740 744 746 747 748 753 756 760 762 763 765 766 767 768 770 771 772 776 778 779 780 785 788 792 794 795 796 801 805 806 807 809 |

FIG. 9

| Modulation Sequence | Active Carriers in P1 (Antenna 2) |
|---|---|
| CSS1 (64) | 46 48 49 50 52 53 55 56 57 58 60 61 63 67 68 69 71 72 73 74 76 77 79 83 86 91 92 93 95 99 100 101 103 104 105 106 108 109 111 115 118 123 126 128 129 130 134 139 140 141 143 147 150 155 156 157 159 163 164 165 167 168 169 170 |
| CSS2 (256) | 174 176 177 178 180 181 183 184 185 186 188 189 191 195 196 197 199 200 201 202 204 205 207 211 214 219 220 221 223 227 228 229 231 232 233 234 236 237 239 243 246 251 254 256 257 258 262 267 268 269 271 275 278 283 284 285 287 291 292 293 295 296 297 298 302 304 305 306 308 309 311 312 313 314 316 317 319 323 324 325 327 328 329 330 332 333 335 339 342 347 348 349 351 355 356 357 359 360 361 362 366 368 369 370 372 373 375 376 377 378 380 381 383 387 388 389 391 392 393 394 398 400 401 402 404 405 407 408 409 410 414 416 417 418 422 427 430 432 433 434 436 437 439 440 441 442 444 445 447 451 452 453 455 456 457 458 460 461 463 467 470 475 476 477 479 483 484 485 487 488 489 490 492 493 495 499 502 507 510 512 513 514 518 523 524 525 527 531 534 539 540 541 543 547 548 549 551 552 553 554 556 557 559 563 566 571 574 576 577 578 582 587 590 592 593 594 596 597 599 600 601 602 606 608 609 610 614 619 620 621 623 627 630 635 638 640 641 642 646 651 652 653 655 659 662 667 668 669 671 675 676 677 679 680 681 682 |
| CSS3 (64) | 685 686 687 688 690 691 693 694 695 697 700 705 709 710 711 713 716 721 724 728 730 731 732 737 741 742 743 745 749 750 751 752 754 755 757 758 759 761 764 769 773 774 775 777 781 782 783 784 786 787 789 790 791 793 797 798 799 800 802 803 804 808 810 811 |

FIG. 10

| Modulation Sequence | Active Carriers in P1 (Antenna 1) |
|---|---|
| CSS1 (64) | 1 3 5 7 9 11 13 16 19 21 23 26 28 30 32 35 37 39 41 43 45 48 50 52 54 56 58 60 63 65 67 69 71 73 76 78 80 82 84 86 88 90 93 95 97 99 101 103 105 107 109 111 113 115 117 119 121 123 125 127 129 128 129 130 134 139 140 141 143 147 150 155 156 132 134 136 |
| CSS2 (256) | 138 140 142 144 146 148 150 152 155 157 159 161 163 165 167 170 172 174 176 178 180 182 184 186 188 190 192 194 197 199 201 203 206 208 210 212 214 216 218 220 222 225 227 229 231 233 235 238 240 242 244 246 249 251 253 256 258 260 262 264 266 268 270 272 274 277 279 281 283 285 287 289 291 293 295 297 299 302 304 307 309 311 314 316 319 321 323 325 328 330 333 336 338 340 342 344 346 348 350 353 355 357 360 362 364 366 368 370 372 374 377 379 381 384 387 389 391 394 396 398 401 404 407 409 411 413 416 418 420 422 425 427 429 431 433 436 438 440 442 444 447 450 452 455 458 460 462 464 466 468 470 472 474 476 478 480 483 485 487 489 492 494 496 499 501 503 505 508 510 512 514 516 519 521 523 525 527 529 532 535 537 539 541 544 547 549 551 553 555 558 560 562 564 567 569 571 573 575 577 579 581 584 586 588 591 593 595 598 600 602 604 606 608 610 612 615 617 619 621 624 626 628 630 632 634 636 638 640 642 645 647 649 651 653 655 657 659 661 663 665 667 670 673 676 679 681 683 686 688 690 692 694 697 700 702 704 |
| CSS1 (64) | 706 708 710 712 715 718 720 722 724 726 729 732 734 736 739 742 744 746 748 751 754 756 758 760 762 764 766 768 770 772 774 776 779 781 783 786 788 790 793 795 797 799 801 803 805 808 810 812 814 816 818 820 822 825 827 830 832 835 838 841 843 846 848 851 |

US 9,838,174 B2

BROADCASTING SIGNAL TRANSMITTING APPARATUS AND METHOD FOR CONTROLLING THE SAME

CROSS-REFERENCE TO RELATED APPLICATION

This application claims priority from Korean Patent Application No. 10-2013-0066188, filed on Jun. 10, 2013, in the Korean Intellectual Property Office, the disclosure of which is incorporated herein in its entirety by reference.

BACKGROUND

1. Field

The present disclosure relates to a broadcasting signal transmitting apparatus and a method for controlling the same, and more particularly to a broadcasting signal transmitting apparatus that transmits a plurality of signals through a plurality of antennas, and a method for controlling the same.

2. Description of the Related Art

DVB-T2 (Digital Video Broadcasting—Second Generation Terrestrial) is the second-generation European terrestrial digital broadcasting standard that can improve the performance of DVB-T (Digital Video Broadcasting—Terrestrial) which has been adopted and used as the standard in more than 35 countries throughout the world including Europe. The DVB-T2 realizes the increase of transmission capacity and high bandwidth efficiency using technologies such as LDPC (Low Density Parity Check) codes and a 256 QAM modulation method. Thus, the DVB-T2 can provide services, such as HDTV, in a limited band.

However, the inventor has recognized that a next-generation broadcasting system may be required to support transmission using one or more antennas at a same time so as to support TV viewing at home and also through a user terminal device.

For the purpose of frame synchronization, a preamble symbol that is positioned at a start point of a T2 frame has a single structure. However, current DVB-T2 systems are not able to discriminate between a plurality of simultaneously used antennas by using a preamble of the DVB-T2.

SUMMARY

The present disclosure has been made to address at least the above problems and/or disadvantages and to provide at least the advantages described below. Accordingly, an aspect of the present disclosure provides a broadcast signal transmitting apparatus that allocates subcarrier positions of a whole frequency to respective preamble symbols, and a method for controlling the same.

According to one aspect of the present disclosure, a broadcasting signal transmitting apparatus that transmits a plurality of signals through a plurality of antennas, includes a signal generator configured to generate the plurality of signals each of which includes at least one preamble symbol and data symbols; a frequency allocator configured to allocate a first subcarrier position of a whole frequency to a first preamble symbol included in a first signal among the plurality of signals of a whole frequency and to allocate, by shifting a frequency position of the first subcarrier position by a preset interval, a second subcarrier position in which the allocated subcarrier position is shifted at a preset interval as a subcarrier position for to a second preamble symbol included in a second signal among the plurality of signals; and a transmitter configured to Client Set Due Date the plurality of signals through the plurality of antennas, the plurality of antennas corresponding to respective the subcarrier positions allocated to the plurality of signals.

The frequency allocator may allocate, by shifting a frequency position of the second subcarrier position by the preset interval, a third subcarrier position to a third preamble symbol included in a third signal among the plurality of signals.

The frequency allocator may shift the frequency position of the first and second subcarrier positions by the preset interval so that the first to third subcarrier positions, respectively allocated to the first to third signals, do not overlap each other.

The frequency allocator may allocate the first subcarrier position to the first preamble symbol included in the first signal among the plurality of signals so that a PAPR (Peak to Average Power Ratio) of the first subcarrier position is equal to or lower than a predetermined value.

The frequency allocator may determine an interval between subcarriers for the first preamble symbol based on a number of subcarriers allocated to the preamble symbols among the number of the plurality of antennas and the total number of the subcarriers, and allocates the subcarrier position based on the determined interval.

The number of the plurality of antennas may be determined based on a length of the preamble symbol and an FFT (Fast Fourier Transform) size of the preamble symbol.

The broadcasting signal transmitting apparatus according to the aspect of the present disclosure may transmit the plurality of signals using a DVB-T2 (Digital Video Broadcasting—Second Generation Terrestrial) method.

Each of the plurality of signals may include a T2 frame that includes a P1 preamble symbol, a P2 preamble symbol, and data symbols, and the preamble symbol may include the P1 preamble symbol.

The P1 preamble symbol may indicate a start point of the T2 frame, the P2 preamble symbol may transmit information on the data symbols, and the data symbols may transmit data.

The number of preamble symbols generated by the signal generator may be equal to the number of the plurality of antennas.

Adjacent subcarriers of the first subcarrier position may be spaced apart by a random interval that is greater than or equal to the minimum interval.

According to another aspect of the present disclosure, a method for controlling a broadcasting signal transmitting apparatus that transmits a plurality of signals through a plurality of antennas, includes generating the plurality of signals each of which includes at least one preamble symbol and data symbols; allocating a first subcarrier position of a whole frequency to a first preamble symbol included in a first signal among the plurality of signals; allocating, by shifting a frequency position of the first subcarrier position by a preset interval, a second subcarrier position for a second preamble symbol included in a second signal among the plurality of signals; and transmitting the plurality of signals through the plurality of antennas, the plurality of antennas corresponding to respective subcarrier positions allocated to the plurality of signals.

The method according to the aspect of the present disclosure may further include allocating, by shifting a frequency position of the second subcarrier position by a preset interval, a third subcarrier position for a third preamble symbol included in a third signal among the plurality of signals.

The allocating the first and second subcarrier positions comprises shifting the frequency position at the preset interval so that the first to third subcarrier positions, respectively allocated to the first to third signals, do not overlap each other.

The allocating as the subcarrier position may include allocating the first subcarrier position comprises allocating the first subcarrier position to the first preamble symbol included in the first signal among the plurality of signals so that a PAPR (Peak to Average Power Ratio) of the first subcarrier position is equal to or lower than a predetermined value.

The allocating of the subcarrier position may include determining an interval between subcarriers for the first preamble symbol included in the first signal among the plurality of signals based on a number of subcarriers allocated to the preamble symbols among a number of the plurality of antennas and a total number of the subcarriers, and allocating the first subcarrier position based on the determined interval.

The number of the plurality of antennas may be determined based on a length of the preamble symbol and an FFT (Fast Fourier Transform) size of the preamble symbol.

The broadcasting signal transmitting apparatus may transmit the plurality of signals using a DVB-T2 (Digital Video Broadcasting—Second Generation Terrestrial) method.

Each of the plurality of signals may be composed of a T2 frame including a P1 preamble symbol, a P2 preamble symbol, and data symbols, and the preamble symbol may be the P1 symbol.

The P1 preamble symbol may indicate a start point of the T2 frame, the P2 preamble symbol may transmit information on the data symbols, and the data symbols may transmit data.

According to another aspect of the present disclosure, a broadcasting signal transmitting apparatus includes: a frequency allocator configured to allocate a first subcarrier position, which corresponds to a first antenna, to a first preamble symbol of a first signal, and to allocate a second subcarrier position, which corresponds to a second antenna, to a second preamble symbol of a second signal by shifting a frequency position of the first subcarrier position by a preset interval; and a transmitter configured to transmit the first signal through a first antenna and to transmit the second signal through a second antenna.

The frequency allocator may allocate the first subcarrier position to the first preamble symbol so that an interval between any two subcarriers of the first subcarrier position is at least a minimum interval.

The frequency allocator may be configured to set the interval between any two adjacent subcarriers of the first subcarrier position to be a random interval that is greater than or equal to the minimum interval.

The minimum interval between any two adjacent subcarriers of the first subcarrier position may be equal to a number of antennas used by the transmitter.

The frequency allocator may allocate the second subcarrier position to the second preamble symbol so that no subcarrier of the second subcarrier position overlaps with a subcarrier of the first subcarrier position.

According to another aspect of the present disclosure, a broadcasting signal transmitting apparatus including: a signal generator configured to generate a first signal and a second signal, the first signal including a first preamble symbol and first data symbols, the second signal including a second preamble symbol and second data symbols; a frequency allocator configured to allocate first subcarriers of a first subcarrier position to the first preamble symbol, and to allocate second subcarriers of a second subcarrier position to the second preamble symbol by shifting frequency positions of the first subcarriers by a predetermined interval; and a transmitter configured to transmit the first signal using a first antenna and to transmit the second signal using a second antenna.

The frequency allocator may be further configured to space the first subcarriers apart from one another by random intervals and so that no adjacent first subcarriers are spaced apart by less than a minimum subcarrier spacing interval.

The signal generator may be further configured to generate a third signal including a third preamble symbol and third data symbols; the frequency allocator may be further configured to allocate third subcarriers of a third subcarrier position to the third preamble symbol by shifting frequency positions of the second subcarriers by the predetermined interval; and the transmitter may be further configured to transmit the third signal using a third antenna.

The frequency allocator may be further configured to space the first subcarriers apart from one another so that no first subcarrier overlaps with any of the second and third subcarriers.

As described above, according to various embodiments of the present disclosure, since the subcarrier positions are allocated to the respective preamble symbols, and the plurality of signals are transmitted through the plurality of antennas, the signals through the different antennas can be discriminated from each other.

BRIEF DESCRIPTION OF THE DRAWINGS

The above and other aspects, features and advantages of the present disclosure will be more apparent from the following detailed description when taken in conjunction with the accompanying drawings, in which:

FIGS. 4 to 6 are diagrams illustrating arrangements of indexes of subcarrier positions allocated to preamble symbols that are calculated in consideration of the FFT size of the preamble symbol, the length of the preamble symbol, and a PAPR, according to exemplary embodiments of the disclosure;

FIG. 7 is a diagram explaining a method for extending subcarrier positions allocated to preamble symbols according to another exemplary embodiment of the present disclosure;

FIGS. 8 and 9 are diagrams illustrating subcarrier indexes allocated to the existing preamble symbols and subcarrier indexes allocated to extendable preamble symbols according to exemplary embodiments of the present disclosure in the case where the FFT size of the preamble symbol is 1K (1024) and the length of the preamble symbol is 384;

FIG. 10 is a diagram illustrating subcarrier indexes generated by a method for extending preamble symbols of the present disclosure in accordance with the existing DVB-T2 preamble symbol structure, according to an exemplary embodiment of the present disclosure;

DETAILED DESCRIPTION

Hereinafter, exemplary embodiments of the present disclosure are described in detail with reference to the accompanying drawings.

Figure 1:
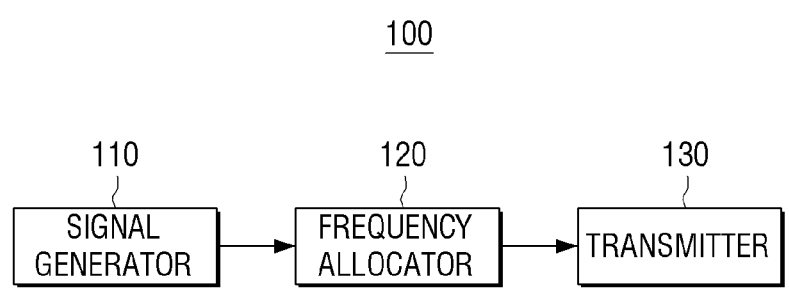
FIG. 1 is a block diagram illustrating the configuration of a broadcasting signal transmitting apparatus according to an exemplary embodiment of the present disclosure.

FIG. 1 is a block diagram illustrating the configuration of a broadcasting signal transmitting apparatus according to an exemplary embodiment of the present disclosure.

Referring to FIG. 1, a broadcasting signal transmitting apparatus 100 includes a signal generator 110, a frequency allocator 120, and a transmitter 130.

The broadcasting signal transmitting apparatus 100 may transmit a plurality of signals through a plurality of antennas.

Here, the broadcasting signal transmitting apparatus may be a digital broadcasting signal transmitting apparatus that digitalizes and processes a broadcasting signal, such as audio, data, and video, and transmits the processed digital broadcasting signal to a digital transfer system. A digital broadcasting system may include digital devices, such as, for example, a microphone, a video camera, a video tape recorder (VTR), a video effect device, a signal switch, etc. The digital broadcasting signals are carried and broadcast by the standardized digital broadcasting system. The digital broadcasting signal transmitting apparatus may be used for realizing studio-class video and audio quality, equal-quality reception regardless of places, and for providing multichannel programs according to the progress of compression modulation technology. Also, since different modulation methods are used for television, audio, and data broadcasts in the existing analog broadcasting system, but the same modulation method can be used in the digital broadcasting system, the digital broadcasting signal transmitting apparatus may easily introduce new services, such as multimedia services through one broadcasting wave and interactive services, and may have diverse reception types, such as stable mobile signal reception.

Further, according to the features and properties of digital broadcasting, video and audio signals should be compressed. However, in response to the compression ratio increasing, the picture quality and the sound quality deteriorate. The degree of deterioration differs depending on the contents of the video or audio signal. Further, if the strength of a received radio wave is lower than a predetermined value, it becomes difficult to receive the radio wave. Further, the compression between transmission and reception may be fixedly determined. Thus, once the picture quality or the sound quality is determined, it becomes difficult to improve the picture quality or the sound quality.

The signal generator 110 may generate a plurality of signals each of which includes at least one preamble symbol and data symbols. Here, for example, the preamble symbol is a binary character string that is recorded in the front of each block when information is recorded on a magnetic tape. The preamble signal is used to match the synchronization during reading.

Further, according to an embodiment of the present disclosure, the preamble symbol may be used to match the synchronization of a frame through indication of a start point of the frame.

The broadcasting signal transmitting apparatus 100 may transmit a plurality of signals using the DVB-T2 method. A T2 frame is a unit in which data is transmitted using the DVB-T2 method.

Accordingly, a DVB-T2 system and a frame structure will be described.

Figure 2A:
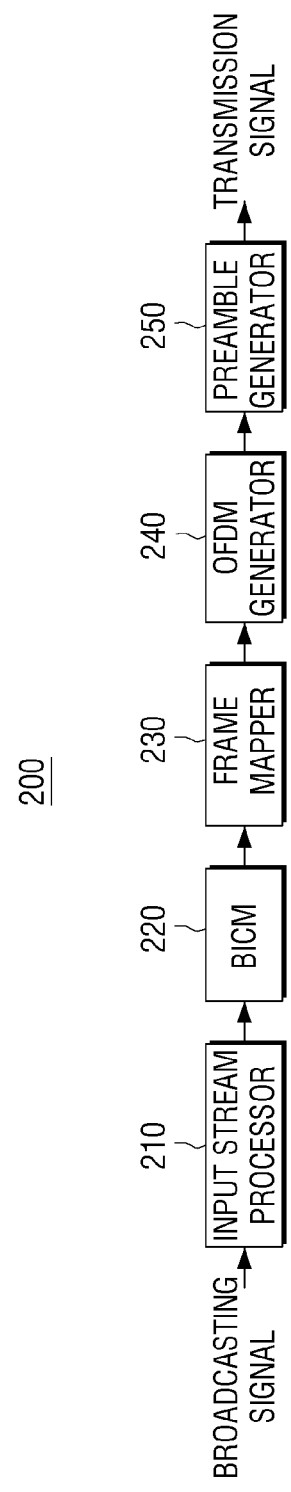
FIGS. 2A and 2B are block diagrams of a DVB-T2 system and a frame structure according to exemplary embodiments of the present disclosure.
Figure 2B:
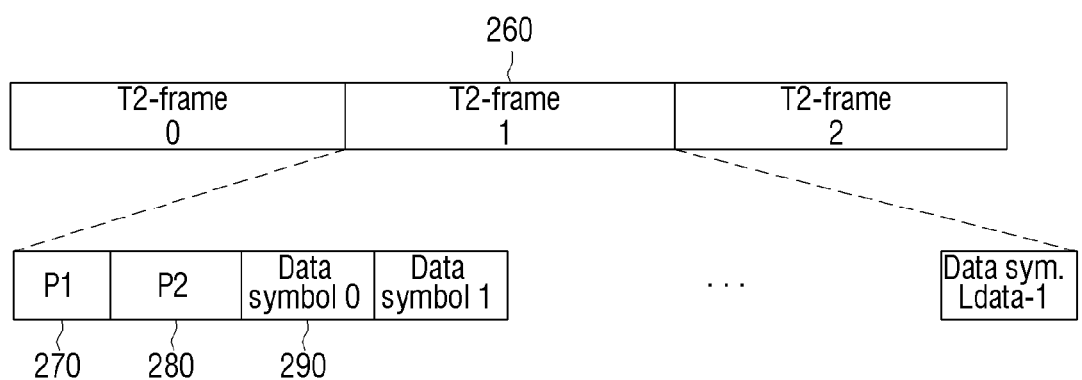

FIG. 2A is a block diagram of a DVB-T2 system according to an exemplary embodiment of the present disclosure. FIG. 2B is a frame structure according to an exemplary embodiment of the present disclosure.

FIG. 2A refers to a transmitter that generates a T2 signal using the DVB-T2 transmission method. In input stream processor 210 may serve to generate a baseband frame format signal from an input broadcasting signal.

Further, a BICM (Bit-Interleaved Coded Modulation) operator 220 may encode the input baseband frame format signal using LDPC codes, and the encoded signal may be modulated.

Here, the DVB-T2 method is provided with LDPC codes having lengths of 64800 bits (normal codes) or 16400 bits (short codes), and can encode the input signal with various code rates. The encoded signal may be modulated through QPSK (Quadrature Phase Shift Keying), 16 QAM (Quadrature Amplitude Modulation), 64 QAM, 256-QAM, or 1024 QAM.

Further, a frame mapper 230 may generate a T2 frame structure for OFDM (Orthogonal Frequency Division Multiplexing) transmission. Here, the T2 frame structure may include a data subcarrier for transmitting the modulated broadcasting signal, a pilot for channel estimation, and a subcarrier (or reserved tone) for reducing a PAPR (Peak to Average Power Ratio).

The OFDM generator 240 may transform the signal input from the frame mapper 230 into a time domain signal using an IFFT (Inverse Fast Fourier Transform) method for transforming a frequency domain signal into a time domain signal.

Further, a preamble generator 250 may generate a transmission signal through addition of the preamble to a start portion of a T2 frame for the T2 frame synchronization. FIG. 2B illustrates a structure of a plurality of T2 frames in the time domain of the DVB-T2. One of T2 frames 260 may include a P1 preamble symbol 270 for indicating a start position of the frame, a P2 preamble symbol 280 for transmitting a L1 (Layer 1) signal, and data symbols 290 for transmitting the broadcasting signal.

Specifically, the P1 preamble symbol may be positioned at a first portion of the T2 frame and may be used to detect the start point of the T2 frame. Further, the P1 preamble symbol uses a 1K FFT size and is a guard interval type signal. The P1 preamble symbol in the frequency domain may use 384 subcarriers among 853 subcarriers of 1K FFT, and may transmit 7-bit information.

As described above, the broadcasting signal transmitting apparatus 100 that transmits the plurality of signals through the plurality of antennas may support the DVB-T2 system and may be compatible with the DVB-T2 system.

In particular, the signal generator 110, the frequency allocator 120, and the transmitter 130 according to an exemplary embodiment of the present disclosure may be applied to a P1 symbol inserter and a D/A converter in a modulator module (not shown) of the DVB-T2 system.

Specifically, if G1 information, in which a last portion of the OFDM symbol is copied and a guard interval is inserted into an OFDM symbol in a CP (Cyclic Prefix) form, is transmitted from a G1 guard inserter to the P1 symbol inserter, the P1 symbol inserter may insert two or more preamble symbols for each frame. In the case of using two or more preamble symbols, burst fading that may be generated in a mobile fading environment is further strengthened, and thus the signal detection performance can be improved.

Further, the P1 symbol inserter inserts a P1 symbol into a start portion of each frame and outputs the P1 symbol inserted into the frame to the D/A converter.

The preamble symbol P1 has four main purposes. First, the preamble symbol P1 is used for a sufficient initial signal scanning time only in sensing P1 for rapid recognition of the T2 signal. The symbol structure may enable any frequency offset to be sensed even in the case where the receiver is adjusted to a nominal center frequency. In this case, it is not required for the receiver to separately test all possible offsets, and thus a scanning time is reduced.

The second purpose of P1 is to discriminate the preamble itself as the T2 preamble. The P1 symbol may be used to discriminate the preamble itself from other formats used for a FEF part that coexists in the same super frame.

The third purpose is to send a basic TX parameter signal, for decoding the remainder of the preamble, in order to help during an initialization process. The fourth purpose of P1 is to enable the receiver to detect and correct the frequency and time synchronization.

Further, the D/A converter may convert each signal frame, into which the P1 symbol is inserted, into an analog signal and may transmit the analog signal through a corresponding transmission antenna.

According to an exemplary embodiment of the present disclosure, with respect to each signal frame into which the P1 symbol is inserted, the D/A converter may allocate a subcarrier position to a first preamble symbol included in a first signal among a plurality of signals of a whole frequency. The D/A converter may allocate a frequency position, in which the allocated subcarrier position is shifted at a preset interval, as a subcarrier position for a second preamble symbol included in a second signal among the plurality of signals. Then, the D/A converter may convert the signal frame into an analog signal, and transmit the analog signal through the corresponding transmission antennas.

Further, the modulator module may transmit the broadcasting signal in a MISO (Multiple-Input and Single-Output) or MIMO (Multiple-Input and Multiple-Output) method through the plurality of transmission antennas.

The frequency allocator 120 may allocate a subcarrier position to the first preamble symbol included in the first signal among the plurality of signals of the whole frequency. For example, the frequency allocator 120 may set a preamble symbol at a front end of the T2 frame that constitutes one video signal, that is, a video signal corresponding to one broadcasting channel, in the broadcasting signal transmitting apparatus 100. Then, the frequency allocator 120 may allocate the subcarrier position that is a part of the frequency for transmitting the set preamble symbol, and carry the set preamble symbol on the subcarrier to transmit the subcarrier.

Also, the frequency allocator 120 may allocate a frequency position in which the subcarrier position allocated to the first preamble symbol included in the first signal among the plurality of signals is shifted at a preset interval as the subcarrier position for a second preamble symbol included in a second among the plurality of signals. Here, the preset interval for shifting the subcarrier position may be changed.

Further, the frequency allocator 120 may allocate the frequency position that is generated by shifting the subcarrier position allocated to the first preamble symbol at the preset interval as the subcarrier position for the second preamble symbol so that the subcarrier position allocated to the first preamble symbol and the subcarrier position allocated to the second preamble symbol do not overlap each other.

If the subcarrier position allocated to the first preamble symbol and the subcarrier position allocated to the second preamble symbol overlap each other, a problem may occur in transmitting the preamble symbol because it is not possible to transmit the first preamble symbol and the second preamble symbol together at one subcarrier position. Here, if the problem occurs in transmitting the preamble symbol, it is not possible to match the frame synchronization, and thus a receiving apparatus is unable to receive and process the signal appropriately to cause communication disorders to occur.

On the other hand, the frequency allocator 120 may allocate the frequency position that is generated by shifting the subcarrier position allocated to the second preamble symbol at the preset interval as the subcarrier position for the third preamble symbol so that the subcarrier position allocated to the second preamble symbol and the subcarrier position allocated to the third preamble symbol do not overlap each other.

Further, the frequency allocator 120 may allocate the subcarrier position for the third preamble symbol so that the subcarrier position for the third preamble symbol does not overlap either one of the subcarrier position allocated to the second preamble symbol and the subcarrier position allocated to the first preamble symbol.

As a result, the frequency allocator 120 may allocate the subcarrier positions so that all the subcarrier positions allocated to the plurality of preamble symbols do not overlap each other. Accordingly, each of the allocated subcarrier positions may be used to transmit one preamble symbol only, and may be transmitted corresponding to one antenna from among the plurality of antennas. As a result, the broadcasting signal transmitting apparatus 100 can transmit the respective preamble symbols using the plurality of antennas, and thus can transmit a MIMO type broadcasting signal.

For example, in the case where a base station and a user terminal device have a plurality of antennas, the base station may divide one video signal, insert preamble symbols into the divided video signals, and simultaneously transmit the video signals through the plurality of antennas. In this case, the user terminal device may simultaneously receive the divided video signals through the plurality of antennas, detect the preamble symbols inserted into the divided video signals, and perform synchronization of the divided video signals to reproduce the video.

The transmitter 130 may transmit the plurality of signals through the plurality of antennas using an OFDM method.

Specifically, the OFDM is a modulation method for multiplexing a high-speed transmission signal to a plurality of orthogonal narrow-band carriers (subcarriers), and operates to divide a data stream having a high transmission ratio into a large number of data streams having low transmission ratios and to simultaneously transfer the data streams using a plurality of subcarriers. That is, the OFDM is a multiplexing technology from the point that it simultaneously transmits a high-speed original data stream of one channel through multiple channels, and is a modulation technology from the point that it carries the divided data streams on multiple subcarriers to transmit the divided data streams. Further, respective subcarrier waveforms are orthogonal to each other on the time axis, but overlap each other on the frequency axis.

Accordingly, the transmitter 130 may generate a series output data stream by dividing a plurality of signals into a large number of data streams, encrypting the divided data streams with subcarriers, and obtaining and performing IFFT (Inverse Fast Fourier Transform) and parallel-serial conversion of the subcarrier signals. Further, the transmitter 130 may insert a header into the generated data stream and may convert the digital signal into an analog signal for transmission from the antennas. Here, the header may be a preamble symbol.

Figure 3:
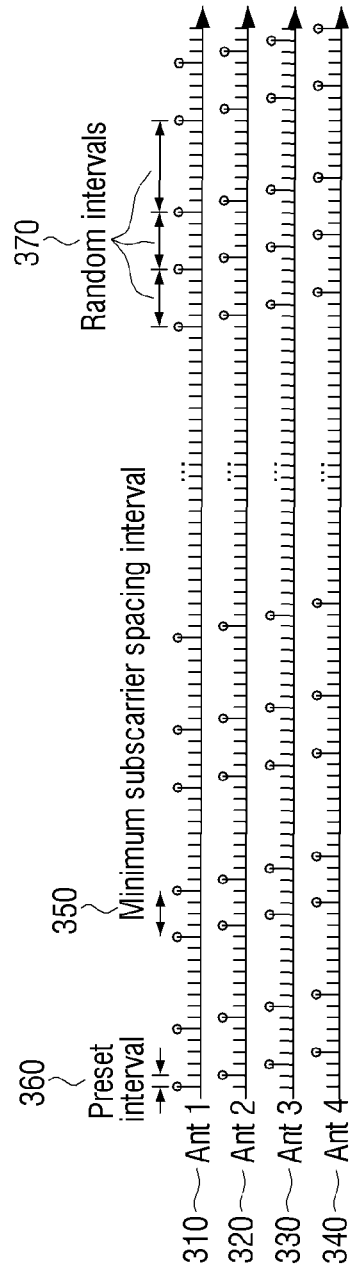
FIG. 3 is a diagram illustrating subcarrier positions for a plurality of preamble symbols according to an exemplary embodiment of the present disclosure.

FIG. 3 is a diagram illustrating subcarrier positions for a plurality of preamble symbols according to an exemplary embodiment of the present disclosure.

Referring to FIG. 3, the frequency allocator 120 may allocate a subcarrier position 310 to a first preamble symbol that is transmitted through antenna 1 (Ant1). Here, the frequency allocator 120 may allocate the subcarrier position 310 to the first preamble symbol included in the first signal among the plurality of signals so that a PAPR (Peak to Average Power Ratio) of the allocated subcarrier position 310 is equal to or lower than a predetermined value.

Here, the PAPR means a ratio of a peak power to an average power as a reference for indicating an influence that a baseband transmission signal exerts on the transmitter. That is, although the power of the transmitter generally means an average power, a peak power exists in the actually transmitted power, and if such a peak power is not properly designed, mutual modulation may occur to cause the broadcasting quality to deteriorate. Accordingly, the broadcasting signal transmitting apparatus 100 should transmit the broadcasting signal so that the PAPR is decreased.

If the subcarriers of the subcarrier position 310 are positioned at equal intervals, the PAPR is increased. That is, in the case of transmitting a broadcasting signal through subcarriers in a predetermined period, the influence exerted on the transmitter is accumulated for the same time, and as a result, the PAPR is increased to cause the deterioration of the broadcasting quality.

Accordingly, the frequency allocator 120 can lower the PAPR through arrangement of the subcarriers of the subcarrier position 310 at random intervals 370.

Further, the frequency allocator 120 may allocate a subcarrier position 320 for the second preamble symbol that is transmitted through antenna 2 Ant2 by shifting the frequency position of the subcarrier position 310 by a preset interval 360.

Here, the subcarrier position 320 for the second preamble symbol is transmitted through antenna 2 Ant2. The subcarrier position 320 should be shifted by the preset interval 360 so that it does not overlap the subcarrier position 310.

Further, the frequency allocator 120 may allocate a subcarrier position 330 for a third preamble symbol that is transmitted through antenna 3 Ant3 by shifting the frequency position of the subcarrier position 320 by the preset interval 360.

Here, the subcarrier position 330 for the third preamble symbol that is transmitted through antenna 3 Ant3. The subcarrier position 330 should be shifted by the preset interval 360 so that it does not overlap the subcarrier position 320 for the second preamble symbol that is transmitted through antenna 2 Ant2.

Further, the frequency allocator 120 may allocate a subcarrier position 340 for a fourth preamble symbol that is transmitted through antenna 4 Ant4 by shifting the frequency position of the subcarrier position 330 by the preset interval 360.

Here, the subcarrier position 340 for the fourth preamble symbol that is transmitted through antenna 4 Ant4. The subcarrier position 340 should be shifted by the preset interval 360 so that it does not overlap the subcarrier position 330 for the third preamble symbol that is transmitted through antenna 3 Ant3.

As illustrated in FIG. 3, respective subcarrier positions 310, 320, 330, and 340 for the first preamble symbol transmitted through Ant1, the second preamble symbol transmitted through Ant2, the third preamble symbol transmitted through Ant3, and the fourth preamble symbol transmitted through Ant4, respectively, do not overlap each other.

In other words, to obtain the subcarrier position 320 the subcarriers of subcarrier position 310 are each shifted by a preset interval 360 in this example. Likewise, to obtain the subcarrier position 330 the subcarriers of subcarrier position 320 are each shifted by the same preset interval 360 in this example. Similarly, to obtain the subcarrier position 340 the subcarriers of subcarrier position 330 are each shifted by the same preset interval 360 in this example. Since a number of antennas, four in this example, is equal to the number of preamble symbols to be transmitted and the minimum subcarrier spacing interval 350, and the subcarrier positions 320, 330, and 340 are obtained by shifting the subcarrier position 310 by the preset interval 360, the respective subcarrier positions 310, 320, 330, and 340 for the first through fourth preamble symbols do not overlap each other. Thus, even though the subcarriers of subcarrier position 310 are spaced apart by random intervals 370 that are greater than or equal to a minimum subcarrier spacing interval 350, the respective subcarrier positions 320, 330, and 340 do no overlap each other. According to the description above, it should be understood that the preset interval 360 is not always "1" and that the number of antennas and the minimum subcarrier spacing interval 350 is not always "4". Rather, as described herein, these values are obtained according to the particular implementation.

Further, the preset interval 360 may be changed so that the respective subcarrier positions 310, 320, 330, and 340, for the respective preamble symbols transmitted through all the antennas, do not overlap each other.

That is, in FIG. 3, the frequency allocator 120 allocates the frequency position that is shifted for one space based on the subcarrier position 310 for the first preamble symbol transmitted through Ant1 as the subcarrier position 320 for the second preamble symbol transmitted through Ant2. This may also be applied, in the same manner, even to the subcarrier position 330 for the third preamble symbol transmitted through Ant3 and the subcarrier position 340 for the fourth preamble symbol transmitted through Ant4.

However, as described above, if it is possible that the respective subcarrier positions for the respective preamble symbols transmitted through all the antennas to not overlap each other, the shifting interval may include a plurality of spaces.

On the other hand, with reference to the subcarrier position 310 for the first preamble symbol that is transmitted through antenna 1 of FIG. 3, the frequency allocator 120 may set the minimum subcarrier spacing interval 350 for arranging the respective subcarriers. For example, if it is assumed that the FFT size is 1K, the length of the preamble symbol is 128, the number of antennas to be used is 4, and the shifting interval 360 is 1, the minimum subcarrier spacing interval 350 between any one subcarrier and another adjacent subcarrier should be at least 4 so that the respective subcarrier positions 310, 320, 330, and 340 for the first preamble symbol, the second preamble symbol, the third preamble symbol, and the fourth preamble symbol, which are transmitted through antenna 1, antenna 2, antenna 3, and antenna 4, do not overlap each other.

That is, in consideration of the number of subcarrier positions for the preamble symbols that are required according to the shifting interval and the number of antennas to be used, the frequency allocator 120 may set the minimum interval 350 between any one subcarrier and another adjacent subcarrier so that the respective subcarrier positions for the respective preamble symbols that are transmitted through all the antennas do not overlap each other.

On the other hand, the frequency allocator 120 may set the maximum interval between any one subcarrier and another adjacent subcarrier.

For example, if the FFT size of the preamble symbol is 1K under the assumption that the FFT size is 1K, the length of the preamble symbol is 128, the number of antennas to be used is 4, and the shifting interval is 1, the total number of frequencies at which the subcarrier can be positioned is 853, the number of subcarriers used to transmit the preamble symbols is 128, and the minimum interval between any one subcarrier and another adjacent subcarrier is 4. Accordingly, by subtracting 512, which is a value obtained by multiplying 128 (the number of subcarriers used to transmit the preamble symbols) by 4 (the minimum interval between two adjacent subcarriers), from 853 (the total number of frequencies), 341 frequencies remain. Here, since any one subcarrier should be positioned to be spaced apart from the last subcarrier for 4 that is the minimum interval between two adjacent subcarriers, 337 frequencies in total remain, which is obtained by subtracting 4 frequencies from 341 frequencies.

That is, 337 frequencies in total calculated as described above may mean the maximum interval between any one subcarrier and another adjacent subcarrier at the subcarrier position for one preamble symbol.

As a result, with respect to the preamble symbols, the frequency allocator 120 may allocate the subcarrier positions that satisfy the conditions of 1) the minimum interval between two adjacent subcarriers, 2) the maximum interval between the two adjacent subcarriers, and 3) the PAPR that is equal to or smaller than a predetermined value, based on the FFT size of the preamble symbol, the length of the preamble symbol, the number of antennas, and the shifting intervals.

FIGS. 4 to 6 are diagrams illustrating arrangements of indexes of subcarrier positions allocated to preamble symbols that are calculated in consideration of the FFT size of the preamble symbol, the length of the preamble symbol, and the PAPR according to an exemplary embodiment of the present disclosure.

Referring to FIG. 4, the indexes of the subcarrier positions, in which the FFT size of the preamble symbol is 1K, the length of the preamble symbol is 128, and the PAPR is 6.4 dB, are arranged.

That is, the frequency allocator 120 may allocate the subcarrier positions of FIG. 4, which satisfy the conditions that the FFT size of the preamble symbol is 1K, the length of the preamble symbol is 128, and the PAPR is 6.4 dB, to the preamble symbols, and may extend the subcarrier positions through shifting for the required number of antennas.

Further, referring to FIG. 5, the indexes of the subcarrier positions, in which the FFT size of the preamble symbol is 2K (2048), the length of the preamble symbol is 256, and the PAPR is 6.99 dB, are arranged. The frequency allocator 120 may allocate the subcarrier positions of FIG. 5 to the preamble symbols, and may extend the subcarrier positions through shifting for the required number of antennas.

Further, referring to FIG. 6, the indexes of the subcarrier positions, in which the FFT size of the preamble symbol is 4K (4096), the length of the preamble symbol is 512, and the PAPR is 7.73 dB, are arranged. The frequency allocator 120 may allocate the subcarrier positions of FIG. 6 to the preamble symbols, and may extend the subcarrier positions through shifting for the required number of antennas.

Further, referring to FIGS. 4 to 6, it can be confirmed that the respective subcarriers are arranged to be randomly spaced apart from each other rather than regularly spaced apart from each other and to be spaced apart from each other at intervals that are larger than the minimum interval between two adjacent subcarriers.

FIG. 7 is a diagram explaining a method for extending subcarrier positions allocated to preamble symbols according to another exemplary embodiment of the present disclosure.

In the broadcasting signal transmitting apparatus using the existing DVB-T2 method, since the preamble symbols uses only a part of the whole subcarriers, the subcarrier positions allocated to the existing preamble symbols are not changed, but other subcarrier positions are additionally allocated to achieve the extension.

Specifically, the frequency allocator 120 may allocate the subcarrier positions to other preamble symbols which do not overlap the subcarrier positions allocated to the existing preamble symbols based on a table prepared in consideration of the number of antennas to be used, the FFT size of the preamble symbol, and the length of the preamble symbol as shown in FIG. 7, and thus may extend the number of antennas.

Accordingly, the frequency allocator 120 may generate and extend the subcarrier positions for other preamble symbols while maintaining the subcarrier positions allocated to the existing preamble symbols, and thus may be compatible with the existing DVB-T2 method.

Referring to the table of FIG. 7, in the case where the FFT size of the preamble symbol is 1024, that is 1K, and the length of the preamble symbol is 384, the number of usable antennas becomes 2.2, and thus the plurality of signals can be transmitted using two antennas.

Further, the number of usable antennas is 6.7 in three cases. The first case is where the FFT size of the preamble symbol is 1024 and the length of the preamble is 128, the second case is where the FFT size of the preamble symbol is 2048 and the length of the preamble is 256, and the third case is where the FFT size of the preamble symbol is 4096 and the length of the preamble is 512. Thus, the plurality of signals can be transmitted using 6 antennas.

FIGS. 8 and 9 are diagrams illustrating subcarrier indexes allocated to the existing preamble symbols and subcarrier indexes allocated to extendable preamble symbols according to exemplary embodiments of the present disclosure in the case where the FFT size of the preamble symbol is 1K and the length of the preamble symbol is 384.

Referring to FIGS. 8 and 9, the subcarrier indexes allocated to the existing preamble symbols of FIG. 8 and the subcarrier indexes allocated to extended preamble symbols of FIG. 9 do not overlap each other.

However, the method for extending the preamble symbols as described above allocates the subcarrier positions to the preamble symbols using vacant subcarrier positions. Therefore, the method for extending the preamble symbols does not need to satisfy conditions—1) the minimum interval between two adjacent subcarriers, 2) the maximum interval between the two adjacent subcarriers, and 3) the PAPR that is equal to or smaller than a predetermined value—which are required for the frequency allocator 120 to allocate the subcarrier positions to the preamble symbols as shown in FIG. 3.

Referring to FIGS. 8 and 9, the subcarrier indexes allocated to the preamble symbols are divided into CSS1 (64), CSS2 (256), and CSS3 (64) according to the modulation sequence. That is, the subcarrier indexes allocated to the preamble symbols are divided into 64, 256, and 64.

As described above, the subcarrier indexes of the subcarrier position 320 allocated to the second preamble symbol transmitted through Ant2, in which the frequency position is shifted for one space, based on the subcarrier position 310 for the first preamble symbol that is transmitted through Ant1 of FIG. 3, the subcarrier position 330 applied in the same manner to the third preamble symbol and the fourth preamble symbol that are transmitted through Ant3 and Ant4, respectively, and the subcarrier position 340 for the fourth preamble symbol may be indicated to match CSS1 (64), CSS2 (256), and CSS3 (64), which correspond to the modulation sequence as shown in FIGS. 8 and 9.

That is, like the method for generating and extending the subcarrier position for another preamble symbol while maintaining the subcarrier position allocated to the existing preamble symbol as shown in FIGS. 7 to 9, a subcarrier position may be allocated to any one preamble symbol according to an exemplary embodiment of the present disclosure while maintaining the existing DVB-T2 preamble symbol structure as it is. Further, the preamble symbol may be extended by allocating the subcarrier position to still another preamble symbol through shifting based on the above.

FIG. 10 is a diagram illustrating subcarrier indexes generated by a method for extending preamble symbols according to the present disclosure in accordance with the existing T2 preamble symbol.

Here, the FFT size of the preamble symbol is 1K and the length of the preamble symbol is 384 Length in the same manner as the T2 structure.

The frequency allocator 120 may extend the preamble symbol through allocation of the subcarrier position to the preamble symbol of the second antenna based on the subcarrier indexes of FIG. 10. At this time, the subcarrier index of the second antenna may be determined through shifting the subcarrier index of FIG. 10 by 1.

Further, in the case where the preamble length is 128 Length as shown in FIG. 4 and the number of subcarriers that are required is 128, the subcarrier index may be indicated to match the modulation sequence CSS1 (64) and CSS2 (64).

Further, in the case where the preamble length is 256 Length as shown in FIG. 5 and the number of subcarriers that are required is 256, the subcarrier index may be indicated to match the modulation sequence CSS1 (256).

In the case where the preamble length is 512 Length as shown in FIG. 6 and the number of subcarriers that are required is 512, the subcarrier index may be indicated to match the modulation sequence CSS1 (256) and CSS2 (256).

Accordingly, even in the broadcasting signal transmitting apparatus using the existing DVB-T2 method, the extension can be performed by additionally allocating the subcarrier position to still another preamble symbol that is generated through shifting of the subcarrier position allocated to the preamble symbol according to an exemplary embodiment of the present disclosure without changing the subcarrier position allocated to the existing preamble symbol.

Accordingly, the frequency allocator 120 may generate and extend the subcarrier positions for other preamble symbols while maintaining the subcarrier positions allocated to the existing preamble symbols, and thus may be compatible with the existing DVB-T2 method.

Figure 11:
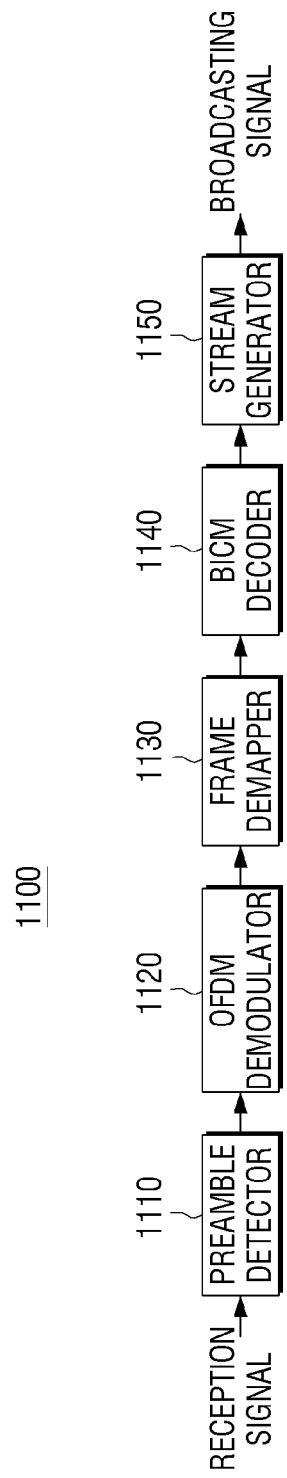
FIG. 11 is a block diagram illustrating a broadcasting signal receiving apparatus to which a DVB-T2 method is applied according to an exemplary embodiment of the present disclosure.

FIG. 11 is a block diagram illustrating a broadcasting signal receiving apparatus to which a DVB-T2 method is applied according to an exemplary embodiment of the present disclosure.

The broadcasting signal receiving apparatus 1100 to which the DVB-T2 method is applied may include a preamble detector 1110, an OFDM demodulator 1120, a frame demapper 1130, a BICM decoder 1140, and a stream generator 1150.

Preamble symbols that are transmitted from a plurality of antennas are transmitted in a frequency division multiplexing method, and the preamble detector 1110 may discriminate the preamble symbols transmitted to the plurality of antennas. Here, the transmitting apparatus (not illustrated) may transmit information on the number of antennas and information on the shift value of the subcarrier position to the receiving apparatus 1100. However, if the information on the number of antennas and the shift value has been set in the transmitting apparatus (not illustrated) and the receiving apparatus 110, the transmitter may not transmit the information.

On the other hand, since the subcarrier positions of the preamble symbols differ for the respective antennas, the broadcasting signal receiving apparatus 1100 may receive the preamble symbol according to the corresponding subcarrier position.

That is, as shown in FIG. 3, the first antenna may use the subcarrier position 310 allocated to the first preamble symbol, the second antenna may use the subcarrier position 320 allocated to the second preamble symbol, the third antenna may use the subcarrier position 330 allocated to the third preamble symbol, and the fourth antenna may determine the subcarrier position 340 allocated to the fourth preamble symbol.

Further, the OFDM demodulator 1120 may perform an OFDM demodulation, and the frame demapper 1130 may generate a decoded signal to be received.

Further, the BICM decoder 1140 may decode the received signal, and the stream generator 1150 may generate a broadcasting signal based on the decoded signal.

Figure 12:
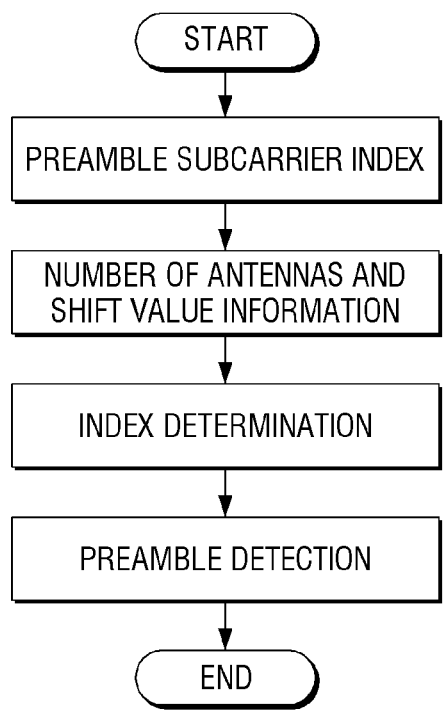
FIG. 12 is a flowchart illustrating a method for determining a subcarrier position of a preamble symbol according to an exemplary embodiment of the present disclosure.

FIG. 12 is a flowchart illustrating a method for determining a subcarrier position of a preamble symbol according to an exemplary embodiment of the present disclosure.

In order to determine the subcarrier positions of the preamble symbols that are transmitted by antennas, the receiving apparatus (not illustrated) may have an index of a subcarrier of a preamble symbol that is a reference. Here, since the information on the index of the subcarrier of the preamble symbol that is the reference is predetermined between the transmitting apparatus (not illustrated) and the receiving apparatus (not illustrated), it is not required to separately transmit the information when the transmitting apparatus (not illustrated) transmits the preamble symbol to the receiving apparatus (not illustrated).

For example, the predetermined index information may be stored in a memory of the receiving apparatus (not illustrated) and then may be read from the memory when the preamble symbol is received. Here, information on the predetermined antennas and the indexes may be information on the subcarrier position allocated to the preamble symbol that is the reference.

On the other hand, position information of the remaining antennas and the indexes may be determined from the subcarrier position allocated based on the antenna information and the shift information.

Further, as described above, the transmitting apparatus (not illustrated) may transmit the antenna information and shift information to the receiving apparatus (not illustrated), and the receiving apparatus (not illustrated) may calculate the subcarrier position based on the received antenna information and shift information.

Further, if the antenna information and shift information have been set in the transmitting apparatus (not illustrated) and the receiving apparatus (not illustrated), the transmitting apparatus may not transmit the corresponding information.

The receiving apparatus (not illustrated) may calculate the subcarrier index positions of the remaining antennas based on the antenna information and the shift information, and may detect the preamble symbol according to the calculated subcarrier index position.

The method for extending the preamble symbol as described above may be used to transmit signals using a plurality of antennas. Further, the method may also be used to discriminate between a plurality of transmitting apparatuses.

Figure 13:
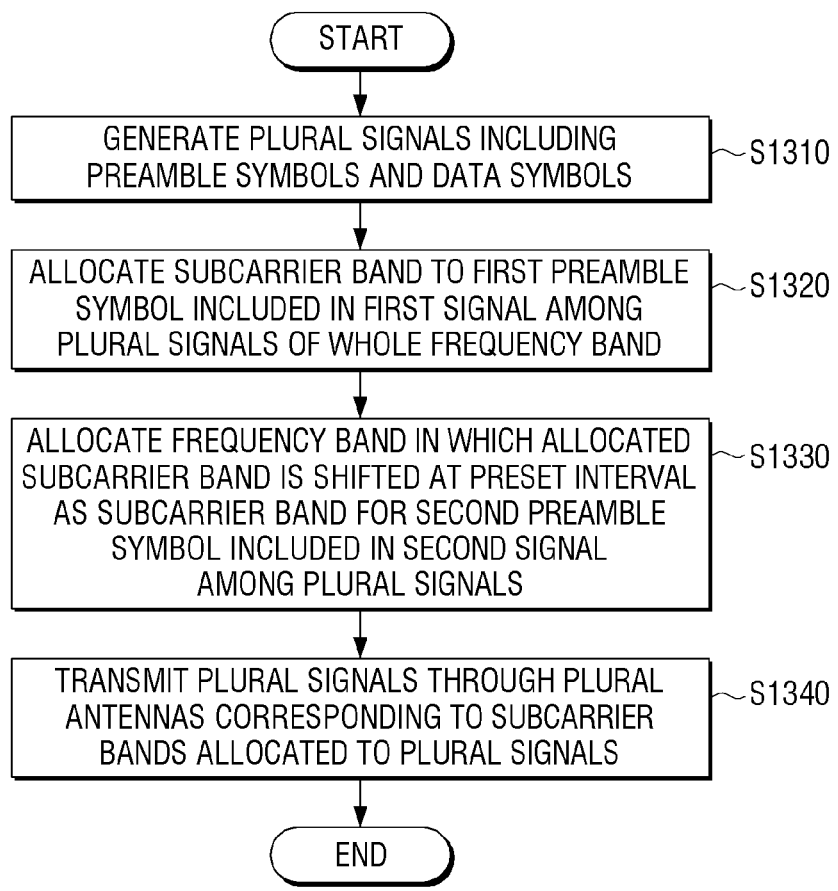
FIG. 13 is a flowchart illustrating a method for controlling a broadcasting signal transmitting apparatus that transmits a plurality of signals through a plurality of antennas according to an exemplary embodiment of the present disclosure.

FIG. 13 is a flowchart illustrating a method for controlling a broadcasting signal transmitting apparatus that transmits a plurality of signals through a plurality of antennas according to an exemplary embodiment of the present disclosure.

According to the method illustrated in FIG. 13, a plurality of signals including respective preamble symbols and data symbols may be generated (S1310).

Then, a subcarrier position may be allocated to a first preamble symbol included in a first signal among the plurality of signals of a whole frequency (S1320).

Here, an interval between the subcarriers for the first preamble symbol included in the first signal among the plurality of signals may be determined based on the number of the plurality of antennas and the number of subcarriers allocated to the preamble symbols among the total number of subcarriers, and the subcarrier positions may be allocated based on the determined intervals.

Further, the plurality of antennas may be determined based on the length of the preamble symbol and the FFT (Fast Fourier Transform) size of the preamble symbol.

Further, the broadcasting signal transmitting apparatus 100 may transmit the plurality of signals using the DVB-T2 method.

Here, each of the plurality of signals may include a T2 frame including a P1 preamble symbol, a P2 preamble symbol, and data symbols, and the preamble symbol according to an exemplary embodiment of the present disclosure may be the P1 preamble symbol.

Further, the preamble symbol according to an exemplary embodiment of the present disclosure may store information on a start point of the T2 frame, the P2 preamble symbol may store information on the data symbols, and the data symbols may store data.

Further, the frequency position in which the allocated subcarrier position is shifted at a preset interval may be allocated as the subcarrier position for the second preamble symbol included in the second signal among the plurality of signals (S1330).

Specifically, the broadcasting signal transmitting apparatus 100 may allocate the frequency position in which the subcarrier position allocated to the first preamble symbol is shifted at a preset interval as the subcarrier position for the second preamble symbol so that the subcarrier position allocated to the first preamble symbol does not overlap the subcarrier position allocated to the second preamble symbol.

At this time, if the subcarrier position allocated to the first preamble symbol and the subcarrier position allocated to the second preamble symbol overlap each other, a problem may occur in transmitting the preamble symbol because it is not possible to transmit the first preamble symbol and the second preamble symbol together at one subcarrier position. Here, if the problem occurs in transmitting the preamble symbol, it is not possible to match the frame synchronization, and thus the receiving apparatus is unable to receive and process the signal appropriately to cause communication disorders to occur.

The frequency position, in which the subcarrier position allocated to the second signal is shifted at the preset interval, may be allocated as the subcarrier position for the third preamble symbol included in the third signal among the plurality of signals.

The frequency position, which is generated by shifting the subcarrier position allocated to the preamble symbol at the preset interval so that the subcarrier position allocated to the second preamble symbol does not overlap the subcarrier position allocated to the third preamble symbol, may be allocated as the subcarrier position for the third preamble symbol.

Further, the subcarrier position may be allocated to the first preamble symbol included in the first signal among the plurality of signals so that the PAPR (Peak to Average Power Ratio) of the allocated subcarrier position is less than or equal to a predetermined value.

The subcarrier position may be allocated to the third preamble symbol so that the subcarrier position for the third preamble symbol does not overlap either one of the subcarrier position allocated to the second preamble symbol and the subcarrier position allocated to the first preamble symbol.

Further, the plurality of signals may be transmitted through the plurality of antennas corresponding to the subcarrier positions allocated to the plurality of signals (S1340).

As a result, the subcarrier positions may be allocated so that all the subcarrier positions allocated to the plurality of preamble symbols do not overlap each other. Accordingly, each of the allocated subcarrier positions may be used to transmit one preamble symbol only, and may be transmitted corresponding to one antenna. As a result, the broadcasting signal transmitting apparatus 100 can transmit the respective preamble symbols using the plurality of antennas, and thus can transmit the MIMO type broadcasting signal.

A non-transitory computer readable medium that stores a program for sequentially performing the control method according to the present disclosure may be provided.

As an example, a non-transitory computer readable medium may be provided, which stores a program that performs generating a plurality of signals each of which includes at least one preamble symbol and data symbols, allocating a subcarrier position to a first preamble symbol included in a first signal among the plurality of signals of a whole frequency, and allocating a frequency position in which the allocated subcarrier position is shifted at preset interval as a subcarrier position for a second preamble symbol included in a second signal among the plurality of signals.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

Further, at least one of the components of the broadcasting signal transmitting apparatus 100 as shown in FIG. 1, and at least one of the components of the broadcasting signal receiving apparatus 1100 as shown in FIG. 11 may be embodied as a functional block structure and a various processing operation. This functional block may be embodied as a hardware and/or software structure that executes a particular function. For example, each component may use a direct circuit structure, such as a memory, processing, logic, a look-up table, etc. that may execute various functions through controls of one or more microprocessors or other control apparatuses Further, although a bus is not illustrated in the above-described block diagram illustrating the broadcasting signal transmitting apparatus, communication between the respective constituent elements in the broadcasting signal transmitting apparatus may be performed through the bus. Further, each device may further include a processor, such as a CPU or a microprocessor for performing the above-described procedures.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A broadcasting signal transmitting apparatus comprising:
   a signal generator configured to generate a plurality of signals comprising a first signal and a second signal, each of the first signal and the second signal including a preamble symbol and a data symbol;
   a frequency allocator configured to:
     insert a first signaling into a preamble symbol of the first signal based on a first set of subcarriers, and
     insert a second signaling into a preamble symbol of the second signal based on a second set of subcarriers; and
   a transmitter configured to transmit the plurality of signals through a plurality of antennas respectively,
   wherein a frequency position of the second set of subcarriers is shifted by a predetermined interval from a frequency position of the first set of subcarriers,
   wherein the first set of subcarriers comprises a first subcarrier and a second subcarrier adjacent to the first subcarrier, a first interval between the first subcarrier and the second subcarrier being determined based on a number of the plurality of signals and the predetermined interval,
   wherein the first set of subcarriers further comprises a third subcarrier adjacent to the second subcarrier, a second interval between the second subcarrier and the third subcarrier being determined by a value greater than the first interval and less than a third interval, and wherein the third interval is determined based on the number of the plurality of signals, the predetermined interval and a number of subcarriers used for transmitting signaling.

2. The broadcasting signal transmitting apparatus as claimed in claim 1, wherein the frequency allocator allocates the frequency position of the first set of subcarriers so that a PAPR (Peak to Average Power Ratio) of the frequency position of the first set of subcarriers is equal to or lower than a predetermined value.

3. The broadcasting signal transmitting apparatus as claimed in claim 1, wherein a number of the plurality of antennas is determined based on a length of at least one of the preamble symbol of the first signal and the preamble symbol of the second signal and an FFT (Fast Fourier Transform) size of the at least one of the preamble symbol of the first signal and preamble symbol of the second signal.

4. The broadcasting signal transmitting apparatus as claimed in claim 1, wherein the broadcasting signal transmitting apparatus transmits the plurality of signals using a DVB-T2 (Digital Video Broadcasting—Second Generation Terrestrial) method.

5. The broadcasting signal transmitting apparatus as claimed in claim 4, wherein each of the plurality of signals includes a T2 frame that includes a P1 preamble symbol, a P2 preamble symbol, and data symbols, and
   wherein at least one of the preamble symbol of the first signal and the preamble symbol of the second signal includes the P1 preamble symbol.

6. The broadcasting signal transmitting apparatus as claimed in claim 5, wherein the P1 preamble symbol indicates a start point of the T2 frame, the P2 preamble symbol transmits information on the data symbols, and the data symbols transmit data.

7. The broadcasting signal transmitting apparatus as claimed in claim 1, wherein a number of preamble symbols generated by the signal generator is equal to the number of the plurality of antennas.

8. A method for controlling a broadcasting signal transmitting apparatus the method comprising:
   generating a plurality of signals comprising a first signal and a second signal, each of the first signal and the second signal including a preamble symbol and a data symbol;
   inserting a first signaling into a preamble symbol of the first signal based on a first set of subcarriers;
   inserting a second signaling into a preamble symbol of the second signal based on a second set of subcarriers; and
   transmitting the plurality of signals through the plurality of antennas respectively,
   wherein a frequency position of the second set of subcarriers is shifted by a predetermined interval from a frequency position of the first set of subcarriers,
   wherein the first set of subcarriers comprises a first subcarrier and a second subcarrier adjacent to the first subcarrier, a first interval between the first subcarrier and the second subcarrier being determined based on a number of the plurality of signals and the predetermined interval,
   wherein the first set of subcarriers further comprises a third subcarrier adjacent to the second subcarrier, a second interval between the second subcarrier and the third subcarrier being determined by a value greater than the first interval and less than a third interval, and wherein the third interval is determined based on the number of the plurality of signals, the predetermined interval and a number of subcarriers used for transmitting signaling.

9. The method for controlling a broadcasting signal transmitting apparatus as claimed in claim 8, furter comprising allocating the freguency position of the first set of subcarriers so that a PAPR (Peak to Average Power Ratio) of the frequency position of the first set of subcarriers is equal to or lower than a predetermined value.

10. The method for controlling a broadcasting signal transmitting apparatus as claimed in claim 8, wherein a number of the plurality of antennas is determined based on a length of at least one of the preamble symbol of the first signal and the preamble symbol of the second signal and an FFT (Fast Fourier Transform) size of the at least one of the preamble symbol of the first signal and the first signal and the preamble symbol of the second signal.

11. The method for controlling a broadcasting signal transmitting apparatus as claimed in claim 8, further comprising transmitting the plurality of signals using a DVB-T2 (Digital Video Broadcasting —Second Generation Terrestrial) method.

12. The method for controlling a broadcasting signal transmitting apparatus as claimed in claim 11, wherein each of the plurality of signals includes a T2 frame that includes a P1 preamble symbol, a P2 preamble symbol, and data symbols, and
  at least one of the preamble symbol of the first signal and the preamble symbol of the second signal includes the P1 preamble symbol.

13. The method for controlling a broadcasting signal transmitting apparatus as claimed in claim 12, wherein at least one of the preamble symbol of the first signal and the preamble symbol of the second signal indicates a start point of the T2 frame, the P2 preamble symbol transmits information on the data symbols, and the data symbols transmit data.

14. A broadcasting signal receiving apparatus comprising:
a symbol detector configured to receive a plurality of signals comprising: a first signal and a second signal each of the first signal and the second signal including a preamble symbol and a data symbol;
a demodulator configured to demodulate the first and second signals; and
a decoder configured to decode the demodulated first and second signals,
wherein a first signaling is inserted into a preamble symbol of the first signal based on a first set of subcarries and a second signaling is inserted into a preamble symbol of the second signal based on a second set of subcarrier,
wherein a frequency position of the second set of subcarriers is shifted by a predetermined interval from a frequency position of the first set of subcarriers,
wherein the first set of subcarriers comprises a first subcarrier and a second subcarrier adjacent to the first subcarrier, a first interval between the first subcarrier and the second subcarrier being determined based on a number of the plurality of signals and the predetermined interval,
wherein the first set of subcarriers further comprises a third subcarrier adjacent to the second subcarrier, a second interval between the second subcarrier and the third subcarrier being determined by a value greater than the first interval and less than a third interval, and
wherein the third interval is determined based on the number of the plurality of signals, the predetermined interval and a number of subcarriers used for transmitting signaling.

15. The broadcasting signal receiving apparatus of claim 14, wherein the first and second signals are simultaneously received at the symbol detector.

* * * * *